Dec. 5, 1950 W. A. PLEDGER 2,532,420
VENTILATOR DEVICE FOR KITCHEN RANGES
Filed June 19, 1945 3 Sheets-Sheet 1

INVENTOR.
WILLIAM A. PLEDGER
BY George B White
ATTORNEY

Dec. 5, 1950          W. A. PLEDGER          2,532,420

VENTILATOR DEVICE FOR KITCHEN RANGES

Filed June 19, 1945          3 Sheets-Sheet 2

INVENTOR
WILLIAM A. PLEDGER
BY George B. White
ATTORNEY

Dec. 5, 1950        W. A. PLEDGER        2,532,420
VENTILATOR DEVICE FOR KITCHEN RANGES
Filed June 19, 1945        3 Sheets-Sheet 3
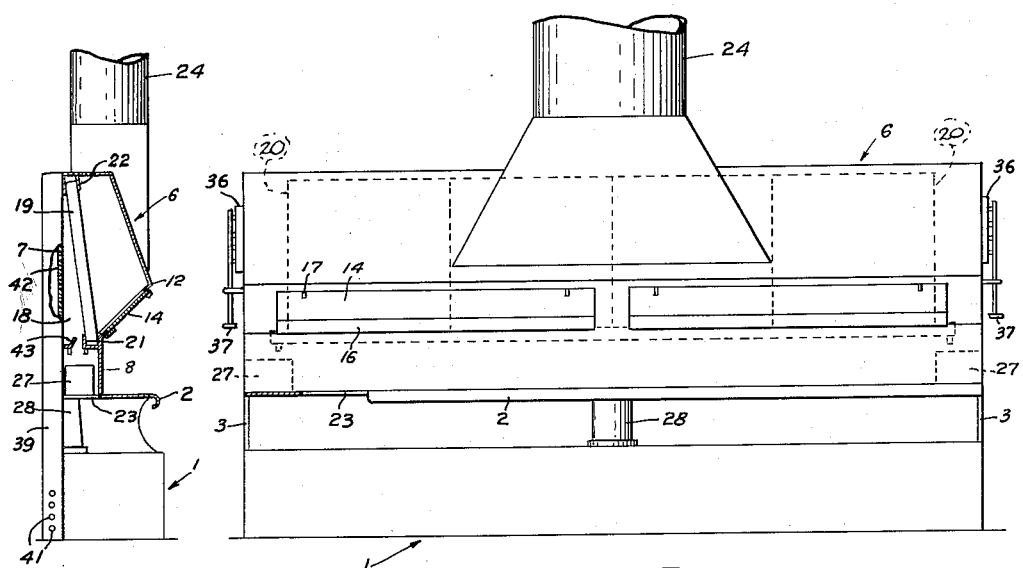
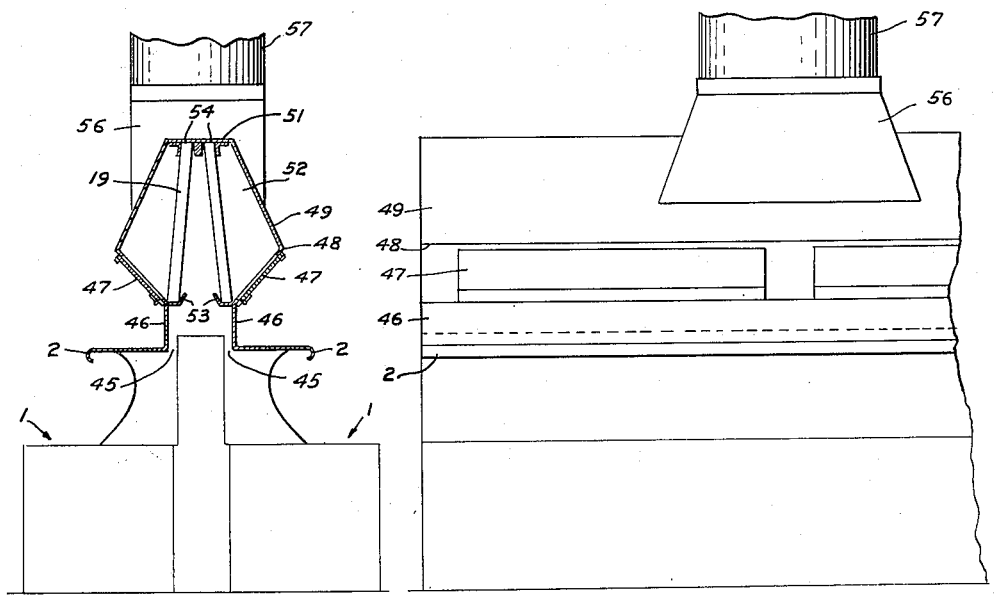
INVENTOR.
WILLIAM A. PLEDGER
BY George B. White
ATTORNEY Patented Dec. 5, 1950

2,532,420

UNITED STATES PATENT OFFICE 2,532,420

VENTILATOR DEVICE FOR KITCHEN RANGES

William A. Pledger, San Francisco, Calif., assignor to Mangrum Holbrook and Elkus, San Francisco, Calif., a corporation of California Application June 19, 1945, Serial No. 600,337

8 Claims. (Cl. 126—299)

This invention relates to a ventilator device for cooking ranges and the like.

An object of the invention is to provide a ventilator device, preferably in the form of an attachment to cooking ranges, for carrying off fumes, smoke and grease, generated by cooking, as well as to carry off fumes from the oven of such ranges, and to collect in a filter all the grease from said air and fumes.

Another object of the invention is to provide a ventilator device with a detachable and replaceable filter in an inclosure to collect the grease from fumes and smoke drawn off from said ranges.

Another object of this invention is to provide a ventilating device with controlled flow above a cooking range for drawing away from the cooking range fumes and smoke and grease-filled air and to trap the grease and impurities from the air in a filter, which latter is readily accessible for cleaning and replacement.

Another object of the invention is to provide a ventilator device and attachment for cooking ranges which is also adapted to draw air from the room in which said cooking range is located.

Another object of the invention is to provide a ventilator device for carrying off fumes and the like from a cooking range and trap the grease in said fumes in a suitable filter, and which is provided with cooling air jackets.

Another object of the invention is to provide a ventilator device for cooking ranges which is fire proof because fire can not be drawn through a filter in which the grease is collected in a closed portion of the device.

Another object of the invention is to provide a ventilator device having means to cool the ventilator surfaces adjacent to the walls thereof.

Another object of this invention is to provide a ventilator device and attachment for cooking ranges which is fire proof; highly useful and simple in construction. Convenience of arrangement, lightness and comparative inexpense of manufacture are further objects which have been borne in mind in the production and development of this invention.

It is understood that various changes in the details of construction may be made without departing from the spirit or scope of the invention as defined by the appended claims.

With the foregoing and other objects in view, which will be made manifest in the following detailed description, reference is had to the accompanying drawings for the illustrative embodiment of the invention, wherein:

Fig. 8 is another form of my ventilator, shown in section.

Fig. 9 is a front view of the form of the ventilator shown in Fig. 8.

Fig. 10 is a double unit ventilator constructed in accordance with my invention, and Fig. 11 is a front view of said double unit ventilator.

Figure 1:
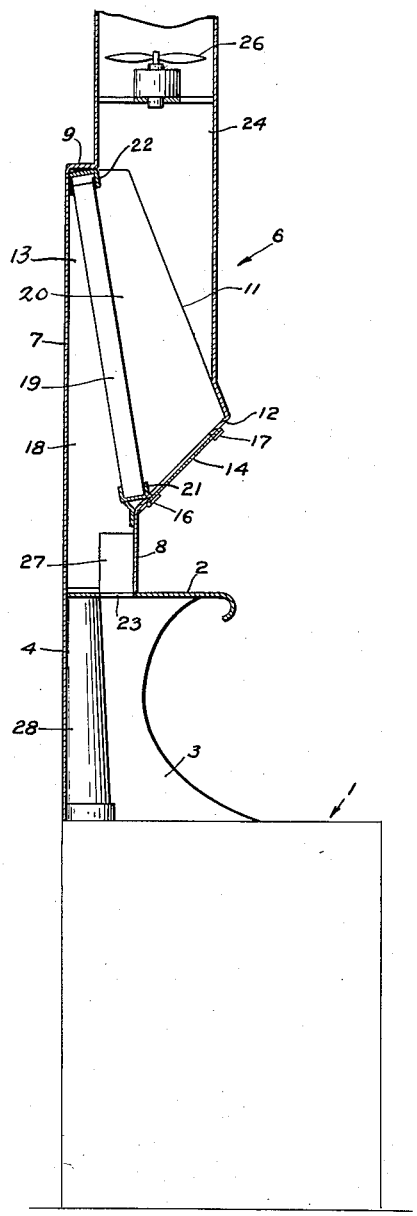
Fig. 1 is a sectional view of an embodiment of my ventilator installed on a stove.
Figure 2:
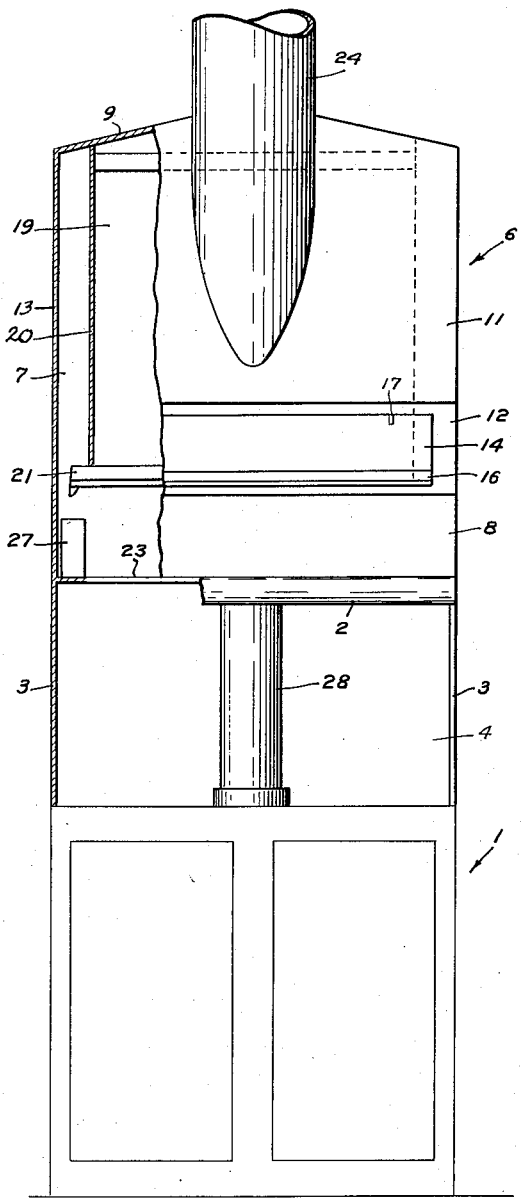
Fig. 2 is a front view, partly in section of said ventilator on the stove.
Figure 3:
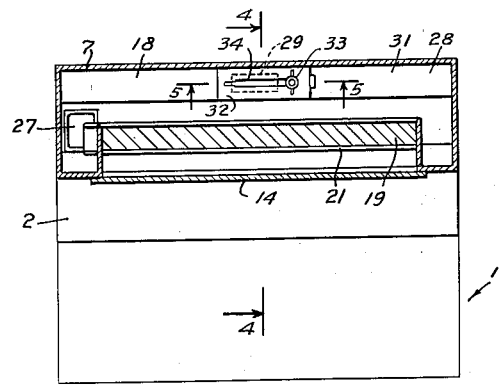
Fig. 3 is sectional plan view of a modified form of my ventilator on a stove, the section being taken on the lines 3—3 of Fig. 4.
Figure 5:
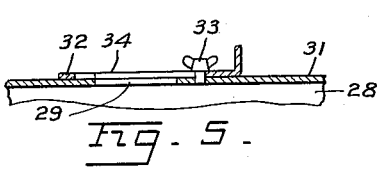
Fig. 5 is a sectional detail view of an embodiment of the draft control from the oven ventilator of the device.
Figure 4:
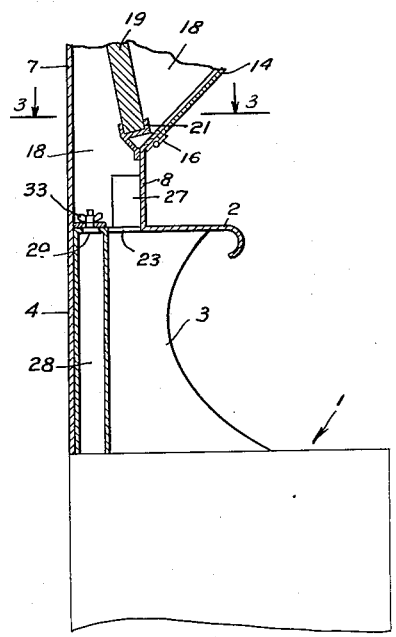
Fig. 4 is a vertical sectional view of said form of the ventilator.

The average range includes a heated cooking surface 1 above which is usually provided a shelf 2 supported on suitable side brackets 3 and on a back plate 4.

My attachment is connected to the back plate and is extended above the shelf and then leads from the range to a suitable location outside of the kitchen or room. I term the entire attachment assembly as a ventilator device which can be attached to or constructed on any cooking range or cooking device to conduct the fumes from the cooking surface. My attachment includes a hood denoted in its entirety by the reference numeral 6. This hood 6, has a back plate 7 which extends the full width of the range and extends upwardly from the back plate 4 of the range. Spaced from and opposite to the back plate 7 is a front wall 8. This front wall 8 extends from the shelf upwardly a comparatively short distance. From the top of the back plate 7 extends forwardly a top wall 9 from the front end of which latter extends downwardly and on an incline away from the back plate 7, an upper front wall 11. The lower end 12 of this upper front wall 11 is spaced above and forwardly of the low front wall 8. The hood is closed at its ends by end walls 13 which cover the ends of the area defined by said back plate 7 and front walls 8 and 11 and top wall 9. In order to gain access to the enclosure thus formed the space between the lower edge 12 of the inclined front wall 11 and the upper edge of the short front wall 8 is covered by doors 14 which are hinged or otherwise removable. In the present illustration, the doors 14 are hinged by hinges 16 onto the top edge of the lower front wall 8 and are held in place by suitable latches 17 or the like at the lower edge 12 of the top front wall.

Figure 6:
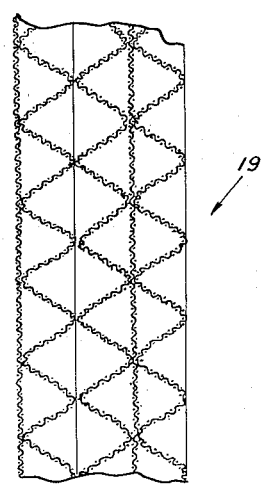
Fig. 6 is a fragmental front view of an illustrative form of a filter for my ventilator, on an enlarged scale.
Figure 7:
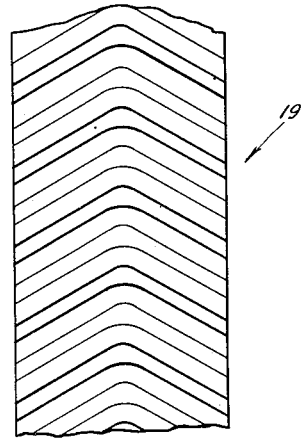
Fig. 7 is a fragmental end view of said filter.

Within the enclosure of the hood 6 is formed an upwardly converging chamber 18 by a plurality of removable filters 19. The filters are preferably made of fine matted wire, but may be made of other suitable materials, and are formed into blocks with perforations or apertures through which the fumes and air must pass from the range. The layers of wire or other material in the filter 19 overlap at angles transverse to the filter and form a screen with angular interstices and passages, which prevent flames passing through the filter. In Figs. 6 and 7 are shown fragments of such a filter on an enlarged scale, but it is to be understood that other suitable filter structures may be employed. The grease and impurities in the air are precipitated and deposited in the interstices of the filters 19. The filters 19 are arranged in series through the entire length of the hood 6 from a baffle 20 spaced from one end wall 13 to another baffle 20 spaced from the other end wall 13, and obstruct the entire passage through hood 6. The lower end of each filter 19 is supported in a channel 21 adjacent the top edge of the short front wall 8. The filters 19 are then inclined upwardly and toward the back plate 7 and extend into a pocket or channel 22 adjacent to and below the rear top corner of the top wall 9. The chamber 18 thus formed under the filters 19 diminishes upwardly. The vertical pockets formed between each baffle 20 and the adjacent end wall 13 permit the provision of openings in said end walls 13 for the purpose of ventilating a room in which the range is located. Inasmuch as the baffles 20 extend from the front of the ventilator toward the back wall to cover the sides of the filters 19, the pockets conduct air or fumes, introduced through such added connections, to the undersides of the filters 19. Such end vents are shown at 36 in Fig. 9.

The fumes from the range are drawn in through an aperture or slot 23 along the rear edge of the shelf 2 and between the front wall 8 and the back plate 7. The fumes are carried away from the hood 6 by a suitable flue 24. This flue 24 may be extended in any direction, vertically or horizontally and downwardly to reach the point of discharge for the fumes or cleared air. Near the discharge end of the flue 24 is provided a motor driven blower 26 for the forced drawing off of the fumes from the range. The lower channel 21 is preferably inclined toward one end of the hood 6 so that the grease accumulated in the filters 19 flows toward the bottom of the filters 19 and is collected at the lower end thereof and there drips into a can or suitable container 27.

It is to be noted that the clearing of the air drawn from the range is accomplished in the filters 19, which latter are completely inclosed in the hood 6. In these inclosed filters 19 all the grease and inflammable material is collected and no fire can be drawn through said filters 19, therefore the entire hood and range is rendered fireproof. In order to remove or replace the filters 19, the doors 14 are unlatched and swung down around the hinges 16. After the doors 14 are opened, the filters 19 can be lifted upwardly and out of the lower channel 21 and then are pulled out through the doors 14 and cleaned or replaced.

It is to be further noted that the fumes from the oven of the range which is beneath the cooking surface of the range, are also drawn out through the same ventilator device. A duct 28 is extended upwardly from the oven above the range surface to a level at about the intake 23. On the top of this duct 28 is provided an adjustable outlet to regulate the amount of heat or heated air taken out of the oven. In the illustrative form this adjustable outlet consists of an outlet 29 through the closed top 31 of the duct 28. On this outlet is movable a closure plate 32 which can be fixed in longitudinally adjusted positions by a suitable nut such as a wing nut 33. An outlet slot 34 is formed longitudinally in the plate 32 which is movable under the nut 33. The plate 32 is longer than the outlet 29 so that it can be shifted longitudinally without uncovering said outlet 29 at the ends of the plate 32. The slot 34 extends beyond one of the ends of the outlet 29 so that by longitudinally shifting the plate 32, the opening through said slot 34 is suitably varied. The plate 32 is adjusted so that the length of the slot 34 overhanging the outlet 29 permits the passing of a desired amount of heated air from the oven therethrough. Thus the surface of the range as well as the oven are ventilated through the same device in proper relations and in a fully fire-proof manner. In the forming of the device shown in Figs. 8 and 9 added ventilation is provided in places where it is desirable to withdraw air from the room itself. For this purpose, a louvre 36 is provided on each end plate. Each louvre 36 is of the usual adjustable shutter type and is provided with a handle 37 to regulate the closing and opening of the same. When the louvres 36 are opened, air is drawn from the kitchen or room in the vicinity of said range.

Another feature of this invention is shown in Figs. 8 and 9, in which a safety device is provided for cooling the back wall of the device as well as of the stove. This consists of a cooling chest 39 formed along the entire back plate of both the range and the ventilating device. This chest is a completely closed chest preferably flat and is formed so that it extends the entire width of the range. Near the bottom of this chest 39 and at the ends thereof are provided a plurality of intake apertures 41 for admitting colder air near the floor of the kitchen or room. On the back wall 7 opposite the filters 19 are provided a plurality of vents 42 which communicate between the chest 39 and the diminishing chamber 18. The draft created by the blower in the ventilating device draws cool are through the chest 39 and into the chamber 18. The circulation of cooler air in the chest cools the back plates 4 and 7 and further prevents any over heating or fire hazard adjacent the wall. In this form another channel 43 is provided on the back wall 7 well above the intake opening 23 to collect any grease that may precipitate on said back wall 7 and flow downwardly. This channel 43 is inclined in the same direction as the front channel 21 and conducts any precipitated grease into the same can or container 27.

In Figs. 10 and 11 an adaption of the invention is shown in connection with double stoves sometimes used in back to back arrangement. In this double form the use of a back wall is entirely eliminated. The double hood is formed cross sectionally by a pair of spaced comparatively low walls 46 respectively extended from longitudinal intakes 45 along the shelves 2 of the opposite ranges. From the upper edge of each wall 46 extends outwardly and upwardly a door 47 hinged in the manner heretofore described and connected to the respective lower edges 48 of converging upper side walls 49, which latter at the top are connected by a top wall 51. End walls 52 conforming to the contour of the cross section of this double hood hold the respective walls together and confine the enclosures within the hood. On the spaced upper edges of the lower walls 46 are provided channels 53 adapted to receive the lower edges of filters 19 in the manner heretofore described. On the underside of the top 51 are provided a pair of retaining grooves 54 which are closer together than the spacing of the lower channels 53, for accommodating the upper ends of the filters 19. The opposite filters 19 placed in each lower channel 53 and in the corresponding top grooves 54 converge upwardly and inclose an upwardly diminishing space therebetween into which the air is drawn from both ranges. The filters 19 are of the same type as heretofore described and may be removed, cleaned and replaced through the doors 47 as heretofore described in connection with the previous forms of this invention. The cleared air is drawn out through a chest 56 and a flue 57 to the point of discharge by suitable blowers or the like as heretofore described. Controlled withdrawal of hot air from the ovens of the ranges can be also arranged at each intake 45 in the manner described in the previous forms of this invention.

In the various forms of this invention the principle of providing a filter in a closed space is employed. The filter is so inclined that it incloses a diminishing chamber which diminishes away from the intake of the ventilating device. Grease and other impurities are trapped and precipitated in the filters 19 so that no flame or dangerous substances or impurities are drawn through the ventilating device. Whatever grease may collect or flow downwardly is collected in channels inclined so as to conduct such grease into a container at one end. The ventilating device cools the surface of the range and purifies the air withdrawn from the range before the air is discharged into the atmosphere. It also purifies to a desired degree the air in the ovens of the ranges and accomplishes that through the same circulation and draft. It is rendered further fire-proof where it is necessary, by cooling the back plate through the circulation of cooler air which is also accomplished through the same draft means in the ventilating device. Furthermore, the air in the vicinity of the range on each side may be also withdrawn and cleared through the suitable adjustment of the louvres on the opposite end walls. The ventilating device is compact, it does not require the changing or reconstruction of the usual range, but it can be easily attached to, assembled and installed on existing ranges. It operates efficiently, it is entirely fire proof and is readily controlled and adjusted by the average man. The filters can be easily removed from the enclosure, cleaned and replaced without the necessity of interrupting the operation of the ventilator device. The ventilator is built in units of such width as to take care of stoves of various lengths, and the filter arrangements may be varied correspondingly. For instance in the forms shown in Figs. 1 to 4 a single filter unit covers the exhaust passage, and in the forms shown in Figs. 8 to 11 a plurality of filter units are inserted in end to end relation to cover the entire length of the exhaust passage.

I claim:

1. In a ventilator device for a cooking range, the combination with the cooking surface and oven of said range; of a hood formed of a back wall, a top, front walls, and end walls, and having an inlet formed at the bottom thereof spaced above the cooking surface of said range, a filter wall extending across the passage in said hood from one end wall to the other and from the front wall to the back wall, said hood having an outlet for conducting air passed through said filter wall, said filter wall being adapted to trap grease and impurities from the air passing therethrough, a hollow conduit extending from the oven of said range to the inlet of said ventilator, and means to regulate the flow of air and fumes from said oven through said conduit.

2. In a ventilator device for a cooking range, the combination with the cooking surface and oven of said range; of a hood formed of a back wall, a top, front walls, and end walls, and having an inlet formed at the bottom thereof spaced above the cooking surface of said range, a filter element extending across the passage in said hood from one end wall to the other and from the front wall to the back wall, said hood having an outlet for conducting air away from said filter, said filter being adapted to trap grease and impurities from the air passing therethrough; a hollow conduit extending from the oven of said range to the inlet of said hood, means to regulate the flow of air and fumes from said oven through said conduit, and means to introduce outside air into said ventilator between said inlet and said filter to intermix with the fumes and air flowing through said inlet.

3. In a ventilating device for a kitchen range having a top cooking surface and an oven, a hood formed of a back plate, a top wall, side walls and a front wall, said hood having an inlet in the bottom thereof, and an outlet leading substantially from the top thereof; a plurality of filters arranged across said hood between the inlet and the outlet, said filters, the back plate and the side plates forming a chamber above the inlet, said filters being inclined from the front wall toward the top of the back plate; said front wall having openings therein for access to said filters; closure members normally closing said openings; said inlet being in close proximity and above said cooking surface to receive fumes and hot air emanating therefrom, a duct connecting said oven with said chamber for directing fumes and hot air from said oven to said chamber, and means for restricting the flow of said fumes and air through said duct.

4. In a ventilator device for a kitchen range for carrying away greasy fumes or the like, a ventilator hood having an inlet leading from above the range into said hood, and an outlet spaced from said inlet, filters between the inlet and outlet adapted to trap grease from the fumes passing through said ventilator hood and to prevent the passing of flames through said filter, and adjustable means on said hood for the admission of air from the outside to the inlet side of said filters to intermix with fumes conducted from said range.

5. In a ventilator device for a kitchen range, a hood, a rear wall, front wall, side walls, top and bottom forming said hood, said bottom having an inlet opening therein adapted to receive fumes from a cooking range, a fume filter mat in the hood above said inlet opening and extending upwardly from said front wall across said hood and inclined to said rear wall defining with said rear wall a chamber diminishing away from said inlet opening, and grease collecting members along the lower edge of said filter at said front wall.

6. In a ventilator device for a kitchen range, a hood, a rear wall, front wall, side walls, top and bottom forming said hood, said bottom having an inlet opening adapted to receive fumes from said range, a fume filter mat in the hood above said inlet opening and extended upwardly from said front wall across said hood and inclined to said rear wall defining with said rear wall a chamber diminishing away from said inlet opening, and means for introducing cold air into said chamber under said filter mat.

7. In a ventilator device for a kitchen range, a hood, a rear wall, front wall, side walls, top and bottom forming said hood, said bottom having an inlet opening adapted to receive fumes from said range, a series of fume filter mats forming an inclined partition along the hood being inclined away from the front wall and extending over said inlet opening, and removable wall sections on said hood through which said mats can be removed individually.

8. In a ventilator device for a kitchen range, a hood, a rear wall, front wall, side walls, top and bottom forming said hood, said bottom having an inlet opening adapted to receive fumes from said range, a fume filter mat in the hood above said inlet opening and extended upwardly from said front wall across said hood and inclined to said rear wall defining with said rear wall a chamber diminishing away from said inlet opening, and a retaining channel along the front wall for holding the lower edge of the filter mat and being inclined toward an end thereof to collect grease drained from said filter mat.

WILLIAM A. PLEDGER.

REFERENCES CITED

The following references are of record in the file of this patent:

UNITED STATES PATENTS

| Number | Name | Date |
|---|---|---|
| Re. 22,228 | Petersen | Dec. 1, 1942 |
| 145,675 | Meyer | Dec. 16, 1873 |
| 311,036 | Rollins | Jan. 20, 1885 |
| 549,390 | Patterson et al. | Nov. 5, 1895 |
| 1,377,694 | Koehler | May 10, 1921 |
| 1,453,665 | Foll | May 1, 1923 |
| 1,477,590 | Powell | Dec. 18, 1923 |
| 1,671,524 | Gerdes | May 29, 1928 |
| 1,710,586 | McCrory | Apr. 23, 1929 |
| 1,732,315 | Ray | Oct. 22, 1929 |
| 1,794,908 | Kreft | Mar. 3, 1931 |
| 2,112,041 | Miller | Mar. 22, 1938 |
| 2,369,375 | Somtag | Feb. 13, 1945 |
| 2,398,508 | Shoemaker | Apr. 16, 1946 |

FOREIGN PATENTS

| Number | Country | Date |
|---|---|---|
| 370,159 | Great Britain | Apr. 7, 1932 |